UNITED STATES PATENT OFFICE.

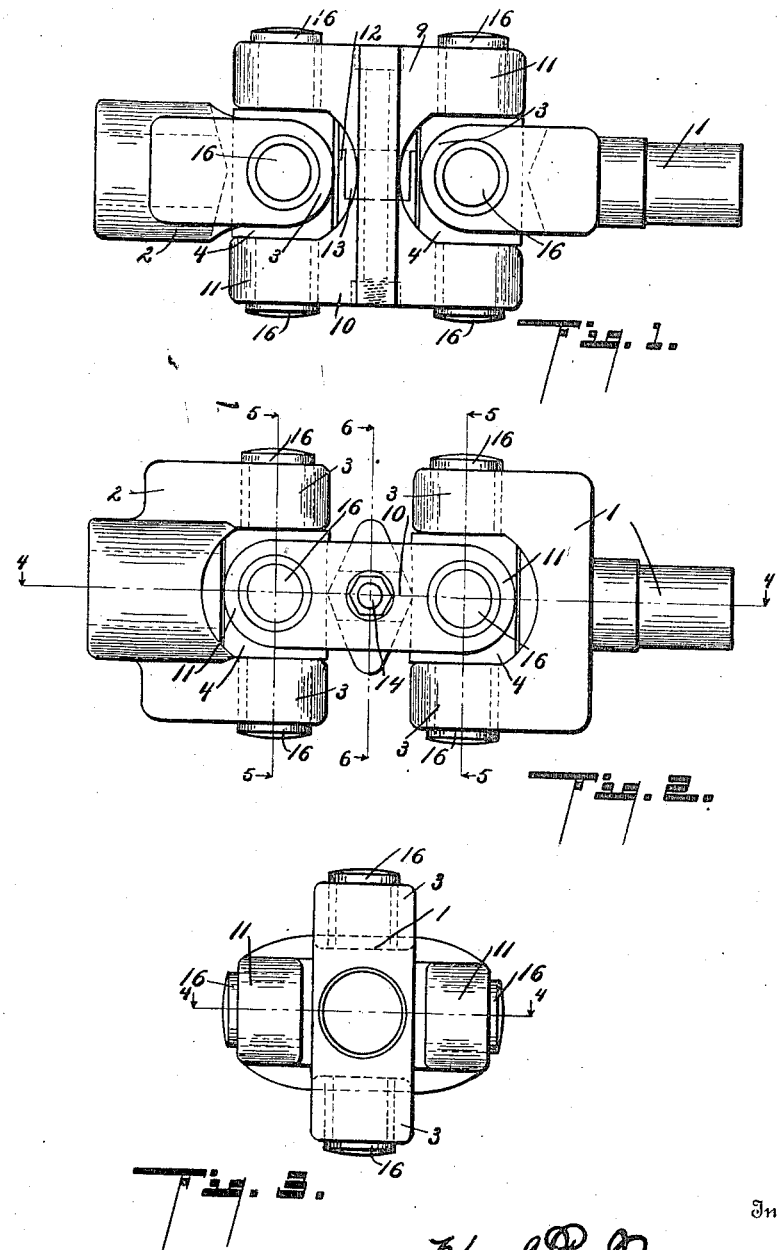

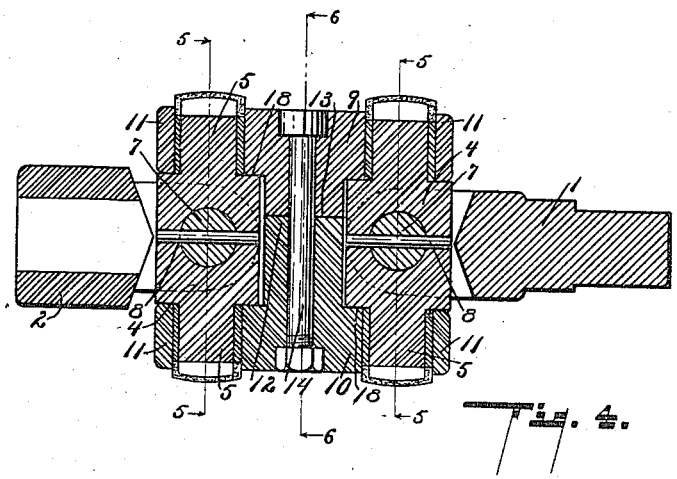
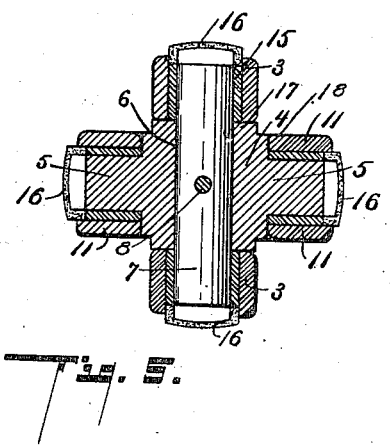
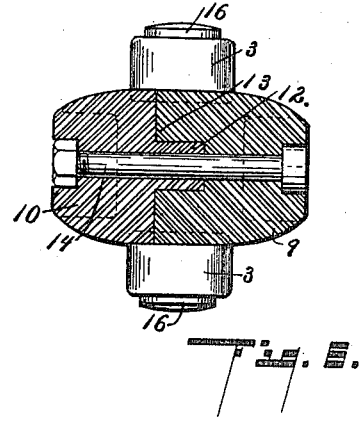

KARL F. RANGER, OF BATTLE CREEK, MICHIGAN.

UNIVERSAL JOINT.

1,034,509.  Specification of Letters Patent.  Patented Aug. 6, 1912.

Application filed May 21, 1909. Serial No. 497,394.

*To all whom it may concern:*

Be it known that I, KARL F. RANGER, a citizen of the United States, residing at Battle Creek, Michigan, have invented certain new and useful Improvements in Universal Joints, of which the following is a specification.

This invention relates to improvements in universal joints.

The main objects of this invention are: First, to provide an improved "double" universal joint which is very compact. Second, to provide an improved universal joint which is strong and durable. Third, to provide an improved universal joint in which the parts are simple and economical to produce and easily assembled or disassembled.

Further objects, and objects relating to structural details, will definitely appear from the detailed description to follow.

I accomplish the objects of my invention by the devices and means described in the following specification.

The invention is clearly defined and pointed out in the claim.

A structure embodying the features of my invention is clearly illustrated in the accompanying drawing, forming a part of this specification, in which:

Figure 1 is a side elevation of a structure embodying the features of my invention. Fig. 2 is a side elevation of the structure shown in Fig. 1, turned one quarter way over. Fig. 3 is an end view, looking from the right of Fig. 2. Fig. 4 is a longitudinal section taken on a line corresponding to line 4—4 of Fig. 2. Fig. 5 is a transverse section, taken on a line corresponding to the lines 5—5 of Figs. 2 and 4, the journal pin being shown in full line. Fig. 6 is a detail transverse section taken on a line corresponding to line 6—6 of Figs. 2 and 3.

In the drawings, similar reference characters refer to similar parts throughout the several views, and the sectional views are looking in the direction of the little arrows at the ends of the section lines.

Referring to the drawing, the shaft members 1 and 2 are forked and provided with bearings 3 on the arms of the forks. The cross members 4 are provided with oppositely-disposed journals 5, and with holes 6 at right angles to the journals 5 to receive the bearing pins 7 for the shaft members. These bearing pins are preferably retained by means of the locking pins 8, which are arranged transversely through the cross members and the bearing pins, see Figs. 4 and 5.

The cross members 4 are secured together by a coupling consisting of a pair of members 9 and 10, each having a pair of oppositely-disposed bearings 11 for the journals 5 on the cross members. These coupling members are preferably provided with male and female engaging portions 12 and 13, respectively, see Figs. 4 and 6, which assist in retaining the parts together, a securing bolt 14 being arranged centrally through the coupling members and through these engaging members 12 and 13. The bearings are preferably provided with bushings 15, as illustrated. The ends of the bearings are preferably provided with caps 16.

The cross member 4 is provided with shoulder-like bearings 17 for the shaft members, and similar bearings 18 for the members of the coupling.

By thus constructing and arranging the parts, they are economical to produce and can be quickly assembled or disassembled.

My improved coupling is very strong and durable, and is also very compact when it is taken into consideration that it is a "double" joint structure. I have illustrated and described the same in detail in the form preferred by me, on account of the structural simplicity and economy and convenience in assembling or disassembling of the parts. The same may, however, be very greatly varied in structural details without departing from my invention.

Having thus described my invention, what I claim as new and desire to secure by Letters Patent is:

In a universal joint, the combination of a pair of forked shaft members; a pair of cross members having journals at each end; journal pins for said shaft members arranged transversely through said cross members, said cross members being provided with thrust bearing surfaces for said shaft members; and a coupling for said cross members comprising a pair of members, having oppositely-disposed bearings for the journals of said cross members, said cross members being provided with thrust bearings for said coupling members, said coupling members being provided with male and female engaging portions disposed between said cross members, and a retaining bolt for securing said coupling members together, located between said cross members.

In witness whereof, I have hereunto set my hand and seal in the presence of two witnesses.

KARL F. RANGER. [L. S.]

Witnesses:
C. M. RANGER,
L. N. C. RANGER.

Copies of this patent may be obtained for five cents each, by addressing the "Commissioner of Patents, Washington, D. C."